June 19, 1962 G. W. GILLEMOT 3,040,121
CABLE SPLICE CLOSURE
Filed Aug. 26, 1959

INVENTOR.
GEORGE W. GILLEMOT
BY
*Elliott & Pastoriza*
ATTORNEYS

United States Patent Office 3,040,121
Patented June 19, 1962

3,040,121
CABLE SPLICE CLOSURE
George W. Gillemot, 2020 Santa Monica Blvd.,
Santa Monica, Calif.
Filed Aug. 26, 1959, Ser. No. 836,232
4 Claims. (Cl. 174—93)

This invention relates generally to splice closures and more particularly to an improved closure structure for encasing splices in either aerial or underground electrical cable conductors.

In conventional telephone wire splicing, the several separate conductors within the cable sheath are spliced together and suitable end securing tape strips are wound around the ends of the splice. The entire spliced portion is then suitably wrapped with binder tape. The binder tape is covered with a strip of neoprene running longitudinally along the splice. The end portions of the splice may then be bound by suitable plastic tape.

While an electrically secure splice is initially achieved by the foregoing steps, after prolonged use particularly in aerial cables, adverse weather conditions such as direct sunlight and adverse physical abrasion such as chafing of the splice against the various support members employed for securing the telephone cables to a support line, can result in ultimate deterioration and failure of the splice. It is the practice accordingly to enclose the entire spliced portion of the cable within a closure which will protect the splice against the direct effects of weathering as well as provide proper mechanical support of the splice itself without any of the support members directly engaging the splice. Such closures as have been proposed however, generally require special tools for installation and are relatively expensive to manufacture. Moreover, considerable time and labor are involved in the actual installation of the closures which necessarily adds to the service expense.

With the foregoing in mind, it is a primary object of the present invention to provide a greatly improved cable splice closure structure which will adequately protect the splice against direct weathering, provide added mechanical strength therefor, and serve as a medium for securing support bands for proper support of the splice itself to a conventional support cable.

Another important object of the invention is to provide a closure meeting the foregoing object which is extremely economical to manufacture as compared to closures presently available.

Still another important object is to provide a cable splice closure which is designed to enable quick and easy installation or removal for inspection and maintenance purposes without the necessity of any special tools.

Another object is to provide an improved cable splice closure which may be re-used.

Yet another object is to provide a cable splice closure of such design that its length is adjustable so that it may readily accommodate splices of different lengths.

These and many other objects and advantages of this invention are attained, in accordance with the preferred embodiment thereof, by providing a pair of cylindrically shaped members each having a longitudinal slot along one lateral side and each having one end tapered to define a conically shaped end portion terminating in a reduced diameter opening. The members are formed of resilient material so that the edges defined by their respective slots may be pried apart to expand the members circumferentially to receive respective half portions of the splice. The conically shaped end portions of each member respectively enclose the two ends of the splice.

In addition to the foregoing, there are provided a pair of slot slide members receiving the slot edges to hold them in opposing relationship. A cylindrically shaped coupling sleeve member, also provided with a longitudinal sleeve slot along one lateral side, is arranged to cover the adjacent portions of the pair of members whereby the pair of members are enclosed over a substantial portion of their length by the sleeve member and are also telescopically movable with respect to the sleeve.

All of the structural components of the closure are formed of a plastic material resilient in nature so that the same may be manually distorted as required to permit easy placement on the cable splice.

A better understanding of the invention will be had by now referring to a detailed description of the preferred embodiment thereof in conjunction with the accompanying drawings in which.

Figure 1:
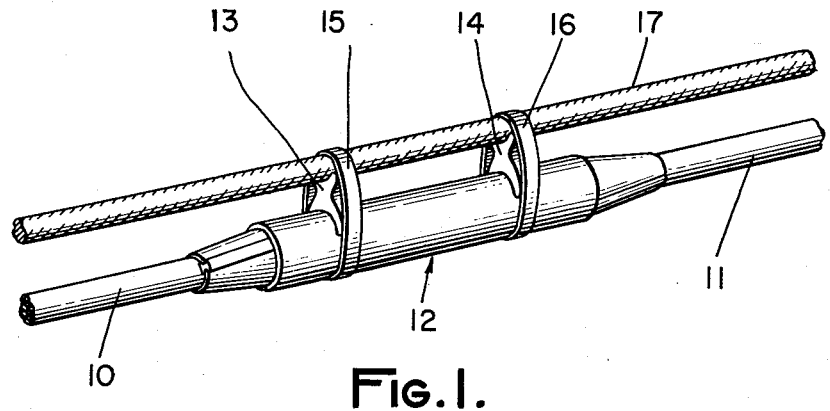
FIGURE 1 is an overall perspective view illustrating the improved closure of this invention secured about a typical telephone cable splice.

Referring first to FIGURE 1, there is illustrated adjacent ends 10 and 11 of a telephone cable line which have been spliced together. The closure of the present invention is designated generally by the numeral 12 and as shown completely encompasses the spliced portion of the cables 10 and 11. Also provided are a pair of conventional spacer blocks 13 and 14 and a pair of supporting bands 15 and 16 for properly supporting the cable splice closure 12 to the conventional overhead support strand 17. FIGURE 1 thus depicts the overall appearance of the completed splice with the closure in place and it will be evident that the entire splice is properly enclosed and adequately protected from direct weathering and abrasion.

Figure 2:
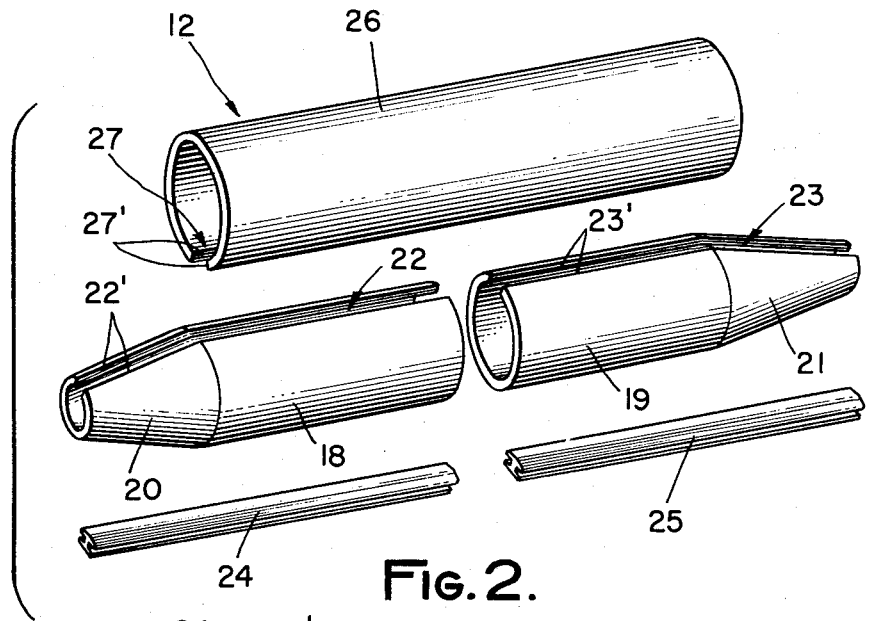
FIGURE 2 is an enlarged exploded view of the basic components making up to closure; and, FIGURE 3 is a cross section illustrating in details one of the slot slide components in position.

Referring to FIGURE 2, the various structural components making up the closure 12 of FIGURE 1 are illustrated in detail. These components include a pair of cylindrically shaped members 18 and 19 having tapered end portions generally conically shaped as indicated at 20 and 21 respectively. The cylindrically shaped members also respectively include longitudinal slots 22 and 23 defining lateral side edges 22' and 23'. These edges may be manually pried apart to expand the members circumferentially. When distorted in this manner, the members may be easily slipped about the ends of the spliced portion of the cable.

Suitable slot slide members, or means, shown at 24 and 25 are provided to hold the opposing edges 22' and 23' of the members 18 and 19 in opposing relationship so that circumferential contraction will not result in the edges overlapping.

The final component of the structure is in the form of a cylindrically shaped sleeve 26 also provided with a longitudinal slot 27 along one lateral edge defining opposing slot edges 27'. These edges are also suitably pried apart to receive the cylindrical members 18 and 19 and thus complete the closure of the cable splice.

Figure 3:
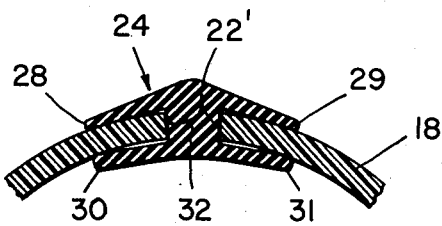

FIGURE 3 illustrates in a detailed cross sectional view the manner in which the slot slides 24 and 25 co-operate with the members 18 and 19. As shown for the member 18, the slot slide 24 includes upper and lower oppositely extending flange portions 28, 29 and 30, 31. These flanges define side grooves for receiving the edges 22' of the member 18. The central body of the slot slide defines a vertical web 32 which supports the flange portions. The slot slide members are formed of resilient plastic material and preferably by an extrusion process and in such a manner that the entrance portions of the side grooves are narrower than the inner portions adjacent the web so that the upper and lower flanges must be biased apart to receive the lateral edges. By this arrangement the slot slide is frictionally held in position.

In operation, the cylindrical members are first placed about the ends of the completed splice. The slot side members are then inserted within the respective members. The coupling sleeve member is then placed over the adjacent ends of the members 18 and 19 to complete the closure. Preferably, the edges of the slot portion of the sleeve 26 abut the edges of the slot slide members. However, if slide members are not used, by rotating the sleeve relative to the members 18 and 19, the slot may be moved to a position to be eclipsed by the outside surfaces of the members. The member slots in turn are then eclipsed by the inside surface of the sleeve.

As a consequence of the use of the inner and outer cylindrical members, the closure may be telescoped by moving the members 18 and 19 into or out of the ends of the sleeve 26 to accommodate a given length of splice.

In actual use, the closure will not only adequately protect the splice from direct weathering elements such as direct sunlight or rain, but will also permit air circulation throughout.

From the foregoing description, it will be evident that the present invention has provided a greatly improved cable splice closure which is not only simple and easy to install, but in addition may be installed relatively quickly to the end that considerable time and labor is saved. Moreover, the various components may be formed by a plastic extrusion process wherein essentially only two dies are required. One of these dies forms the tubular structures and the other, as described heretofore, forms the slot slide members. Thus, economy in manufacture is achieved.

Various modifications falling within the scope and spirit of this invention will occur to those skilled in the art. The invention therefore is not to be thought of as limited to the particular embodiment set forth merely for illustrative purposes.

What is claimed is:

1. A cable splice closure, comprising, in combination: a pair of cylindrically shaped members each having a longitudinal slot along one lateral side and each having one end tapered to define a conically shaped end portion terminating in a reduced diameter opening, said members being formed of a resilient material so that the edges defining their respective slots may be pried apart to expand the members circumferentially to receive respective half portions of said splice, the conically shaped end portions of said members respectively enclosing the two ends of said splice; a pair of slot slide members each having oppositely extending upper and lower flange portions defining side grooves for receiving said edges of said pair of members respectively to hold said edges respectively in opposing relationship; and a cylindrically shaped coupling sleeve member of resilient material having a longitudinal sleeve slot along one lateral side so that the edges of said sleeve slot may be pried apart to expand said sleeve member circumferentially to receive the adjacent portions of said pair of members opposite their conically shaped end portions, whereby said pair of members are enclosed over a substantial portion of their lengths by said sleeve member.

2. The subject matter of claim 1, in which said pair of members may be telescoped from the opposite ends respectively of said sleeve member whereby the overall length of said closure may be adjusted in accordance with the length of said splice.

3. The subject matter of claim 1, in which said slot slide members are formed of resilient material, the entrance portion of said side grooves being narrower than the inner portions thereof so that the opposing upper and lower ends of said flange portions are biased apart to receive said edges and said slot slide members are thereby frictionally held in position.

4. A cable splice closure, comprising, in combination: a pair of cylindrically shaped members of resilient material each having a longitudinal slot along one lateral side so that the edges defining their respective slots may be pried apart to expand the members circumferentially to receive respective half portions of said splice; slide means having upper and lower flanges defining side grooves for receiving said edges of said pair of members to hold said edges respectively in opposing relationship; and a cylindrically shaped coupling sleeve of resilient material having a longitudinal sleeve slot along one lateral side so that the edges of said sleeve slot may be pried apart to expand said sleeve member circumferentially to receive the adjacent portions of said pair of members, whereby said pair of members are enclosed over a substantial portion of their lengths by said sleeve member and whereby said pair of members may be telescoped from the opposite ends respectively of said sleeve member so that the overall length of said closure may be adjusted in accordance with the length of said splice.

References Cited in the file of this patent

UNITED STATES PATENTS

| | | |
|---|---|---|
| 2,267,630 | Weiland | Dec. 23, 1941 |
| 2,317,088 | Salisbury | Apr. 20, 1943 |
| 2,408,253 | Diebold | Sept. 24, 1946 |
| 2,891,101 | Koliss | June 16, 1959 |

FOREIGN PATENTS

| | | |
|---|---|---|
| 894,872 | Germany | Oct. 29, 1953 |
| 1,014,622 | Germany | Aug. 29, 1957 |